United States Patent [19]

Kubo et al.

[11] Patent Number: 5,284,893
[45] Date of Patent: Feb. 8, 1994

[54] COATING COMPOSITION

[75] Inventors: Motonobu Kubo, Minoo; Hiroshi Inukai, Takatsuki; Takahiro Kitahara, Suita, all of Japan

[73] Assignee: Daikin Industries, Ltd., Japan

[21] Appl. No.: 596,392

[22] Filed: Oct. 12, 1990

[30] Foreign Application Priority Data

Oct. 13, 1989 [JP] Japan .................... 1-267291

[51] Int. Cl.$^5$ .............................................. C08K 5/10
[52] U.S. Cl. ................................. 524/315; 524/377; 524/567; 526/249
[58] Field of Search ............... 524/315, 361, 365, 377, 524/567; 526/249

[56] References Cited

U.S. PATENT DOCUMENTS

| | | | |
|---|---|---|---|
| 2,435,537 | 2/1948 | Ford et al. | 526/214 |
| 3,193,539 | 7/1965 | Hauptschein | 526/214 |
| 3,668,193 | 6/1972 | King | 524/365 |
| 3,944,689 | 3/1976 | Luckock et al. | 524/356 |
| 4,612,351 | 9/1986 | Caporiccio et al. | 526/249 |

Primary Examiner—John C. Bleutge
Assistant Examiner—Mark D. Sweet
Attorney, Agent, or Firm—Larson and Taylor

[57] ABSTRACT

The invention provides a coating composition prepared by dissolving a fluorine-type copolymer in an organic solvent, the copolymer comprising:

i) about 50 to about 90 mole % of a structural unit represented by the formula a)

$$-CH_2-CF_2-$$

ii) about 5 to about 30 mole % of a structural unit represented by the formula b)

$$-CF_2-CF_2-$$

and iii) about 5 to about 30 mole % of a structural unit represented by the formula c)

$$-CF_2-CFCl-$$

11 Claims, No Drawings

COATING COMPOSITION

DESCRIPTION OF THE PRIOR ART

Homopolymers of vinylidene fluoride are known to have excellent properties as weather-resistant coating materials. However, since the homopolymer of vinylidene fluoride applied for coating necessitates baking at high temperatures, the homopolymer can not be used on site. Thus the use of such homopolymers has been limited to shop painting such as precoating.

In recent years, fluoroolefin/vinyl ether copolymers have come into use as cold-setting coating materials to obviate the above limitation. Yet these copolymers are of two-pack type which requires the on site mixing of the main component (varnish) and a curing agent (isocyanate) at the specified ratio. The two componets must be mixed exactly at the specified ratio because the mixing outside the range of specified ratio results in failure to provide a coating composition with the desired properties. The requirement for on site precise mixing poses a problem in practical use.

To resolve this problem, vinylidene fluoride has been copolymerized with another fluoroolefin to provide a copolymer having a higher solubility in organic solvents in an attempt to develop coating compositions which are curable at room temperature. Heretofore developed are, for example, a copolymer of vinylidene fluoride and tetrafluoroethylene (e.g. trademark "VT-100", product of Daikin Ind., Ltd.; trademark "KYNAR-SL", product of Pennwalt Co., Ltd.), a copolymer of vinylidene fluoride, tetrafluoroethylene and hexafluoropropylene (e.g. trademark "KYNAR-ADS", product of Pennwalt Co., Ltd.), etc.

Among the above two types of copolymers, the former are soluble only in a limited range of solvents, and the resulting solution has a high viscosity and is therefore difficult to apply, whereas the latter have the problems that they are similar in composition to fluororubber and give a coating film which is soft and easily scratched and that because of their low melting point, the temperatures at which they are used are lower than those for conventional homopolymers of vinylidene fluoride.

It is an object of the present invention to provide a coating composition in which the fluorine-type copolymer has an improved solubility in organic solvents to mitigate the foregoing problem, and which is excellent in weatherability and coating amenability.

DETAILED DESCRIPTION OF THE INVENTION

Our research revealed that fluorine-type copolymers comprising structural units of the formulas a) —CH$_2$—CF$_2$—, b) —CF$_2$—CF$_2$— and c) —CF$_2$—CFCl— have a high melting point and a high solubility in organic solvents and are soluble in various organic solvents, hence suitable for use as coating materials.

According to the present invention, there is provided a coating composition prepared by dissolving a fluorine-type copolymer in an organic solvent, the copolymer comprising:

i) about 50 to about 90 mole % of a structural unit represented by the formula a)

—CH$_2$—CF$_2$— ii) about 5 to about 30 mole % of a structural unit represented by the formula b)

—CF$_2$—CF$_2$— and iii) about 5 to about 30 mole % of a structural unit represented by the formula c)

—CF$_2$—CFCl—

The fluorine-type copolymer to be used in the invention comprises structural units of the formulas a) to c). The fluorine-type copolymers comprising about 50 to about 90 mole % of the structural unit a), about 5 to about 30 mole % of the structural unit b) and about 5 to about 30 mole % of the structural unit c), preferably about 70 to about 85 mole % of the structural unit a), about 10 to about 20 mole % of the structural unit b) and about 5 to about 15 mole % of the structural unit c), have a melting point of not lower than 80° C., an improved heat resistance and an enhanced solubility in organic solvents.

Our research also revealed that a fluorine-type copolymer comprising a fluoroolefin-structural unit d) as well as the structural units a) to c) has a higher solubility in organic solvents and a higher compatibility with the acrylic resins to be described later.

Stated more specifically, the present invention includes a coating composition prepared by dissolving a fluorine-type copolymer in an organic solvent, the copolymer comprising:

i) about 50 to about 90 mole % of a structural unit represented by the formula a)

—CH$_2$—CF$_2$— ii) about 5 to about 30 mole % of a structural unit represented by the formula b)

—CF$_2$—CF$_2$— iii) about 5 to about 30 mole % of a structural unit represented by the formula c)

—CF$_2$—CFCl— and iv) about 0.1 to about 10 mole % of a fluoroolefin-structural unit d).

Examples of the fluoroolefin useful in the invention are trifluoroethylene (TrFE), vinyl fluoride (VF), hexafluoropropylene (HFP), perfluoro(alkyl vinyl ether) (PAVE), etc.

The proportions of structural units a) to d) in the copolymer comprising the structural units a) to d) are about 50 to about 90 mole % of the structural unit a), about 5 to about 30 mole % of the structural unit b), about 5 to about 30 mole % of the structural unit c) and about 0.1 to about 10 mole % of the structural unit d), preferably about 70 to about 85 mole % of the structural unit a), about 10 to about 20 mole % of the structural unit b), about 5 to about 15 mole % of the structural unit c) and about 0.1 to about 10 mole % of the structural unit d).

If the proportion of the fluoroolefin-structural unit d) in the copolymer exceeds 10 mole %, the copolymer is given a reduced solubility in organic solvents and provides a coating film with a soft surface which is easily scratched.

These fluorine-type copolymers are prepared by copolymerizing vinylidene fluoride, tetrafluoroethylene and trifluorochloroethylene, or vinylidene fluoride, tetrafluoroethylene, trifluorochloroethylene and fluoroolefin, usually by emulsion, suspension or solution polymerization method. The polymerization temperature in any polymerization method is 0 to 150.C, preferably about 5 to about 95° C. The polymerization pressure in any polymerization method is about 1 to about 50 kg/cm$^2$G. The polymerization medium to be used is, for example: water in emulsion polymerization; water, chlorofluorohydrocarbons such as 1,1,2-trichloro-1,2,2-trifluoroethane or 1,2-dichloro-1,1,2,2-tetrafluoroethane or mixtures thereof in suspension polymerization; and ethyl acetate, butyl acetate or mixtures thereof in solution polymerization. The emulsifier to be used in emulsion polymerization includes, for example, $C_7F_{15}COONH_4$, $H(CF_2)_8COONH_4$, $H(CF_2)_6COONH_4$, $C_7F_{15}COONa$, etc. Polymerization initiators useful for emulsion polymerization are redox initiators including oxidizing agents (such as ammonium persulfate, potassium persulfate, etc.), reducing agents (such as sodium sulfite, etc.), and salts of transition metals (such as ferrous sulfate, etc.). For suspension or solution polymerization, useful initiators are azo compounds and organic peroxides (such as azobisisobutyronitrile, isobutyryl peroxide, octanoyl peroxide, di-isopropylperoxy dicarbonate, etc.).

As to the molecular weight, the fluorine-type copolymers thus obtained have an intrinsic viscosity of about 0.15 to about 0.80 in dimethylformamide (DMF) at 35° C. at which the copolymer gives a coating film of increased strength and has an enhanced solubility in organic solvents.

Organic solvents useful in the invention, although not specifically limited, are preferably ketones and esters which have a boiling point of about 60° to about 250° C. in view of the solubility. Examples of such ketones and esters are acetone, methyl ethyl ketone, methyl isobutyl ketone, cyclohexanone, ethyl acetate, n-butyl acetate, methyl cellosolve acetate, etc. These solvents are usable singly or at least two of them can be used in mixture. Also usable are tetrahydrofuran, dimethylformamide, dimethylacetoamide, etc. When required, a small amount of an aromatic solvent such as toluene, xylene or the like, or an alcohol may be added.

The fluorine-type copolymer can be well dissolved in these solvents to give a coating composition having a wide range of low to high concentrations. The coating composition provides a coating film which is excellent in gloss and weatherability.

The mixing ratio of the fluorine-type copolymer or like resin and the organic solvent is not specifically limited, and may be in the range such that the concentration of the resin solid is about 5 to about 50% by weight, preferably about 30 to about 50% by weight. The mixing method is not specifically limited, and can be any of conventional methods. For example, the components are fully mixed by a ball mill, paint shaker, sand mill or the like. When required, conventional additives for coating compositions can be added before mixing. Useful additives include pigments, viscosity modifiers, leveling agents, UV absorbers, anti-skinning agents, dispersants, anti-foaming agents and the like.

Our research further revealed that when a thermoplastic acrylic resin is added to the fluorine-type copolymer and the organic solvent, the components in the composition are rendered more dispersible, whereby the adhesion of the resulting coating film is increased. In other words, the present invention includes a coating composition prepared by dissolving the fluorine-type copolymer and the thermoplastic acrylic resin in the organic solvent.

In preparation of the coating composition comprising the fluorine-type copolymer composed of the structural units a) to c) and the thermoplastic acrylic resin dissolved in the organic solvent, the copolymer for use is comprised of preferably about 70 to about 85 mole % of the structural unit a), about 10 to about 20 mole % of the structural unit b) and about 9.5 to about 15 mole % of the structural unit c).

In the case of the above proportions, a high compatibility results between the fluorine-type copolymer comprised of the structural units a) to c) and the thermoplastic acrylic resin.

In preparation of the coating composition comprising the fluorine-type copolymer composed of the structural units a) to d) and the thermoplastic acrylic resin dissolved in the organic solvent, the copolymer for use is comprised of preferably about 70 to about 85 mole % of the structural unit a), about 10 to about 20 mole % of the structural unit b), about 5 to about 15 mole % of the structural unit c), and about 0.1 to about 10 mole % of the structural unit d), more preferably about 70 to about 85 mole % of the structural unit a), about 10 to about 20 mole % of the structural unit b), about 9.5 to about 15 mole % of the structural unit c), and about 0.5 to about 5 mole % of the structural unit d).

Acrylic resins to be used conjointly with the fluorine-type copolymer in the invention are preferably thermoplastic ones, and can be selected from conventional ones without specific limitation. The term "thermoplastic acrylic resin" used herein generally refers to non-curing thermoplastic acrylic resins free of reactive group. Examples of such acrylic resins are homopolymers or copolymers of monomers such as methyl methacrylate (MMA), ethyl methacrylate (EMA), n-butyl methacrylate (BMA), isobutyl methacrylate (IBMA), methyl acrylate (MA), ethyl acrylate (EA), etc. These polymers are usable singly or at least two of them can be used in mixture. As to the molecular weight, the acrylic resin for use herein has preferably an intrinsic viscosity of about 0.05 to about 0.50 in DMF at 35° C. The acrylic resin used along with the fluorine-type copolymer is highly soluble in the organic solvent and the obtained coating film is outstanding in gloss and weatherability.

The amount of the acrylic resin used is about 10 to about 1,900 parts by weight, preferably about 10 to about 400 parts by weight, per 100 parts by weight of the fluorine-type copolymer.

When a thermosetting acrylic resin containing reactive group is used for preparation of a coating composition, it is necessary to cure the group with a curing agent at room temperature or an elevated temperature after application. For this necessity, the coating composition is provided in a two-pack form, and the mixture of components must be mixed with the curing agent exactly at the specified ratio. On the other hand, the thermoplastic acrylic resin as used eliminates this necessity, hence is proper for practical use.

The coating composition of the invention is applied to a substrate and dried at a temperature of about 10° to about 200° C., preferably about 20° to about 50° C. for hours to days, giving a sturdy coating film of high weatherability which is not easily scratched. Substrates to which the coating composition of the invention can be applied are those made of aluminum, iron, stainless steel or like metals, glass, cement, concrete, ceramics or like inorganic materials, polyester, polypropylene, acryl, vinyl chloride, polycarbonate, polyethylene or like resins, wood, paper or the like. The coating composition of the invention may be directly applied to these substrates or to at least one undercoat layer of the type commonly formed in the art, e.g. from a wash primer, an anti-corrosive coating material, an epoxy resin coating material, acryl, a polyester resin coating material, etc. To any of these substrates the coating composition of the invention can be easily applied, because it has an excellent coating amenability.

EXAMPLES

Preparation Example 1

Preparation of fluorine-type copolymer

A 3.5-liter autoclave was charged with 700 g of water, 1180 g of 1,2-dichloro-1,1,2,2-tetrafluoroethane and 5 g of ethyl acetate as a chain transfer agent. The autoclave was subjected to nitrogen replacement and was further charged with 75.2 g of vinylidene fluoride (VdF), 10.6 g of tetrafluoroethylene (TFE) and 1.5 g of chlorotrifluoroethylene (CTFE). The contents in the autoclave were heated to 40° C. and sufficiently stirred and 2.5 g of diisopropylperoxydicarbonate was added thereto to initiate a polymerization. Throughout the polymerization, a mixture of VdF, TFE and CTFE (in a ratio of 80 : 15 : 5 (mole %)) was fed to the reaction system so that the polymerization was conducted under a pressure of 8.0 kg/c$^2$G for 12 hours. The copolymerization thus obtained was collected and dried under reduced pressure at 80° C., giving 200 g of a copolymer. From the result of NMR spectrum analysis, the copolymer was found to contain VdF, TFE and CTFE in a ratio of 81 : 14 : 5 and have a melting point (Tm) of 125° C. and an inherent viscosity $[\eta]=0.79$ (DMF, at 35° C.).

Preparation Examples 2 to 11

Copolymers each having the composition shown below in Table 1 were prepared in the same manner as in Preparation Example 1.

TABLE 1

| Preparation Example | VdF mole % | TFE mole % | CTFE mole % | Other monomers mole % | Tm (°C.) | $[\eta]$ |
|---|---|---|---|---|---|---|
| 2 | 80 | 10 | 10 | — | 95 | 0.56 |
| 3 | 70 | 20 | 10 | — | 110 | 0.42 |
| 4 | 80 | 10 | 5 | TrFE 5 | 123 | 0.61 |
| 5 | 80 | 15 | 5 | — | 123 | 0.28 |
| 6 | 60 | 25 | 15 | — | 102 | 0.59 |
| 7 | 75 | 14 | 11 | — | 110 | 0.36 |
| 8 | 70 | 18 | 12 | — | 104 | 0.34 |
| 9 | 80 | 14 | 5.5 | HFP 0.5 | 118 | 0.35 |
| 10 | 72 | 16 | 9.5 | HFP 2.5 | 90 | 0.34 |
| 11 | 79 | 13 | 8 | — | 100 | 0.36 |

Preparation Example 12

A 3-liter autoclave was charged with 1500 g of water and 3 g of Unidyne DS-101 (product of Daikin Kogyo Co., Ltd.) as an emulsifier, followed by deaeration and nitrogen replacement. Thereafter a monomeric mixture of VdF, TFE and CTFE (in a ratio of 73 : 14 : 13 (mole %)) was fed to the autoclave and the pressure in the autoclave was adjusted to 20 kg/cm$^2$G at 39° C. A 3.5 g quantity of diisopropylperoxydicarbonate was added with stirring to initiate a polymerization. The polymerization was conducted for 8 hours while the monomeric mixture was continuously fed to the reaction system so that the polymerization proceeded under a pressure of 20 kg/cm$^2$G. The dispersion thus obtained was coagulated by freezing and washed with water to eliminate the emulsifier. Thereafter the resulting coagulum was dried at 80° C. under reduced pressure, giving 270 g of a copolymer. From the results of elemental analysis, the copolymer was found to contain VdF, TFE and CTFE in a ratio of 74 : 14 : 12 and have a melting point (Tm) of 108° C. and an inherent viscosity $[\eta]=0.690$ (DMF, at 35° C.).

Solubility test

The copolymers obtained in Preparation Examples 1 to 11 were each dissolved in the organic solvents as shown below in Table 2 by heating at 60° C. for 3 hours so that the resulting solution contained the copolymer in an amount of 50% by weight. The solution was left to stand at room temperature for 1 week and observed The solubility of each solution was evaluated according to the following criteria.

A: the copolymer was dissolved in the solvent and the solution had fluidity after left to stand for 1 week B: the copolymer was dissolved in the solvent but the solution gelled without exibiting fluidity after left to stand for 1 week C : the copolymer was not dissolved in the solvent Table 2 shows the test results.

TABLE 2

| Copolymer | MEK | MIBK | BuAc | McAc/MEK |
|---|---|---|---|---|
| Preparation Example 1 | B | B | C | B |
| Preparation Example 2 | A | A | A | A |
| Preparation Example 3 | A | A | A | A |
| Preparation Example 4 | A | A | A | A |
| Preparation Example 5 | B | B | C | B |
| Preparation Example 6 | B | C | C | B |
| Preparation Example 7 | A | A | A | A |
| Preparation Example 8 | A | A | A | A |
| Preparation Example 9 | A | B | C | A |
| Preparation Example 10 | A | A | A | A |
| Preparation Example 11 | A | A | B | A |
| Preparation Example 12 | A | A | A | A |

The abbreviated words in Table 2 are as follows.
MEK : methyl ethyl ketone
MIBK : methyl isobutyl ketone
BuAc n-butyl acetate
McAc/MEK : methyl cellosolve acetate/methyl ethyl ketone =3/7 (ratio by weight)

Test for compatibility with acrylic resins

A 1 part by weight quantity of a solution of 20 wt. % of each of the following acrylic resins in MIBK was mixed with 2 parts by weight of a solution of 20 wt. % of each of the copolymers obtained in Preparation Examples 1, 2, 5 to 11 in MEK. The mixture was casted on a sheet material made of polyethylene terephthalate (PET) and the coat formed on the sheet material was observed and evaluated for blushing (white turbidity) with the unaided eye. The evaluation was conducted according to the following criteria.

A : A clear coat was obtained

B : A coat showing a slight degree of blushing was obtained

C : A coat showing a significant degree of blushing was obtained

Table 3 shows the results.

| No. | Acrylic resins Composition (molar ratio) | Tg °C. | [η] |
|---|---|---|---|
| 1 | PMMA | 105 | 0.240 |
| 2 | MMA/EMA (93/7) | 100 | 0.264 |
| 3 | MMA/EA (67/33) | 60 | 0.288 |
| 4 | MMA/BMA (50/50) | 50 | 0.187 |
| 5 | EMA/MA (43/57) | 40 | 0.294 |
| 6 | PIBMA | 50 | 0.163 |

TABLE 3

| Copolymer | Acrylic resin (No.) | | | | | |
|---|---|---|---|---|---|---|
| | 1 | 2 | 3 | 4 | 5 | 6 |
| Preparation Example 1 | B | C | B | B | B | B |
| Preparation Example 2 | B | B | A | B | A | A |
| Preparation Example 5 | B | C | B | B | B | B |
| Preparation Example 6 | C | C | C | B-C | B-C | B-C |
| Preparation Example 7 | A | A | A | B | A | A |
| Preparation Example 8 | B | B | A | B | A | A |
| Preparation Example 9 | A | A | A | A | A | A |
| Preparation Example 10 | A | B | A | B | A | A |
| Preparation Example 11 | B | B | B | B | B | B |

Comparative Preparation Examples 1 and 2

Copolymers each having the composition as shown below in Table 4 were prepared in the same manner as in Preparation Example 1.

TABLE 4

| Comp. Prep. Ex. | VdF | TFE | HFP | Tm | [η] |
|---|---|---|---|---|---|
| 1 | 80 | 20 | — | 140 | 0.81 |
| 2 | 77 | 17 | 6 | 76 | 0.49 |

Examples 1 to 12

There were obtained 20% solutions of each of the fluorine-type copolymers prepared in Preparation Examples 1 to 12 in MIBK. An aluminum plate (after BT712 treat-ment, product of Nippon Test Panel Co., Ltd.) on which a base coating composition (trade name: "Hypon 20 ace", dry film thickness of 45 μm, product of Nippon Paint Co, Ltd.) was applied was coated with each solution obtained above using a brush. The coated aluminum plates were dried at 25° C. for 1 day giving coats having a dry film thickness of 25 μm. The coated aluminum plates thus obtained were subjected to the following tests as test specimens (test panels). Table 5 below shows the results.

Comparison Example 1

An attempt was made to prepare a 20% solution of the copolymer obtained in Comparative Preparation Example 1 in MIBK. However, the copolymer was not dissolved in MIBK.

Further, a 20% solution of the copolymer in acetone was prepared. However, a coat formed from the solution by the same procedure as in Examples 1 to 12 exhibited blush-ing.

Comparison Example 2

A coat was produced from the copolymer obtained in Comparative Preparation Example 2 by the same procedure as in Examples 1 to 12. The coated plate obtained was subjected to the following performance tests as a specimen (test panel). Table 5 below shows the results.

Examples 13 to 18

A 20 parts by weight quantity of each of the 20% solutions obtained in Examples 2, 4, 7 to 10 was mixed for 2 hours with 15 parts by weight of a 20% solution of MMA/EA (=67/33 mole %) in 20 wt. % n-butyl acetate with use of a paint shaker (product of Toyo Seiki Seisakusyo Co., Ltd.). Thereafter each solution was applied with a brush to the aluminum plate treated in the same manner as in Examples 1 to 12. The coated aluminum plates were dried at 25° C. for 1 day, giving coats having a dry film thickness of 25 μm. The aluminum plates thus obtained were each subjected to the following performance tests as a specimen (test panel). Table 6 below shows the test results.

Comparison Examples 3 to 7

Coats were prepared by the same procedure as in Examples 13 to 18 using the solutions obtained in Examples 1, 4, 5, 6 and 11 and Comparison Example 2. The coated plates obtained were each subjected to the following performance tests as a specimen (test panel). Table 7 below shows the results.

Performance tests

Pencil hardness : The pencil hardness of the specimen was evaluated according to the method of JIS K 5400.

Adhesion : The coat surface was cut crosswise with a knife to form 100 squares each having a size of 1 mm × 1 mm. A cellophane adhesive tape was adhered to the cut coat surface and peeled therefrom. This adhering-peeling procedure was repeated 10 times. The number of the squares remained unpeeled from the test panel was determined.

Glossiness : The glossiness on mirror surface inclined at an angle of 60° as described in JIS K 5400 was determined.

Gloss retentivity : The specimen was exposed for 4000 hours with use of a sunshine-weather-O-meter (manufactured by Suga Tester Co., Ltd.) under the following conditions: rain cycle of 18 min/120 min, humidity of 60% and the temperature of black panel of 63° C. Gloss retentivity was determined from the values of glossiness before and after the exposure.

Staining resistance : The test panel was attached to a wall near a road where congested vehicular traffic was found and was left to stand for 3 months. Thereafter the test panel was detached from the wall, washed with water, observed and evaluated for the degree of staining with the unaided eye. The evaluation was conducted according to the following criteria.

A : Substantially no staining
B : Stained to a slight extent
C : Stained to a considerable extent.

TABLE 5

| Example | Co-polymer | Pencil Hardness | Adhesion | Gloss-iness | Gloss retentivity | Staining resistance |
|---|---|---|---|---|---|---|
| 1 | Prep. Ex. 1 | B | 100 | 72 | 96 | A |
| 2 | Prep. Ex. 2 | 2B | 100 | 76 | 95 | A |
| 3 | Prep. Ex. 3 | 2B | 100 | 75 | 94 | A |
| 4 | Prep. | B | 100 | 73 | 91 | A |

TABLE 5-continued

| Example | Co-polymer | Pencil Hardness | Adhesion | Glossiness | Gloss retentivity | Staining resistance |
|---|---|---|---|---|---|---|
| 5 | Prep. Ex. 4 | B | 100 | 72 | 96 | A |
| 6 | Prep. Ex. 5 | 2B | 100 | 77 | 95 | A |
| 7 | Prep. Ex. 6 | 2B | 100 | 73 | 96 | A |
| 8 | Prep. Ex. 7 | 2B | 100 | 72 | 95 | A |
| 9 | Prep. Ex. 8 | B | 100 | 74 | 95 | A |
| 10 | Prep. Ex. 9 | 2B | 100 | 76 | 96 | A |
| 11 | Prep. Ex. 10 | 2B | 100 | 72 | 93 | A |
| 12 | Prep. Ex. 11 | 2B | 100 | 71 | 90 | A |
| Comp. Ex. 2 | Comp. Prep. Ex. 2 | 5B | 100 | 70 | 93 | B |

TABLE 6

| Example | Co-polymer | Pencil Hardness | Adhesion | Glossiness | Gloss retentivity | Staining resistance |
|---|---|---|---|---|---|---|
| 13 | Prep. Ex. 2 | H | 100 | 80 | 93 | A |
| 14 | Prep. Ex. 4 | H | 100 | 74 | 85 | A |
| 15 | Prep. Ex. 7 | H | 100 | 81 | 90 | A |
| 16 | Prep. Ex. 8 | H | 100 | 80 | 91 | A |
| 17 | Prep. Ex. 9 | H | 100 | 75 | 87 | A |
| 18 | Prep. Ex. 10 | H | 100 | 78 | 93 | A |

TABLE 7

| Example | Co-polymer | Pencil Hardness | Adhesion | Glossiness | Gloss retentivity | Staining resistance |
|---|---|---|---|---|---|---|
| 3 | Comp. Prep. Ex. 1 | H | 100 | 45 | 65 | A |
| 4 | Comp. Prep. Ex. 5 | H | 100 | 42 | 65 | A |
| 5 | Comp. Prep. Ex. 6 | H | 100 | 35 | 45 | B |
| 6 | Comp. Prep. Ex. 11 | H | 100 | 60 | 82 | A |
| 7 | Comp. Prep. Ex. 2 | B | 100 | 75 | 89 | B |

We claim:

1. A coating composition prepared by dissolving a fluorine-containing copolymer in at least one ester having a boiling point of about 60° to about 250° C., the copolymer comprising:
   i) about 70 to about 85 mole % of a structural unit represented by the formula a)

$-CH_2-CF_2-$ ii) about 10 to about 20 mole % of a structural unit represented by the formula b)

$-CF_2-CF_2-$ and
   iii) about 5 to about 15 mole % of a structural unit represented by the formula c)

$-CF_2-CFCl-$.

2. A coating composition according to claim 1 wherein the fluorine-containing copolymer has an intrinsic viscosity of about 0.15 to about 0.80 in dimethylformamide at 35° C.

3. A coating composition according to claim 1 wherein the organic solvent is at least one species selected from the group consisting of ethyl acetate, n-butyl acetate and methyl acetate cellosolve.

4. A coating composition according to claim 1 wherein the fluorine-containing copolymer is used in an amount of about 5 to about 50% by weight based on the combined amount of the copolymer and the organic solvent.

5. The coating composition according to claim 1 wherein the fluorine-containing copolymer is used in an amount of about 30 to about 50% by weight based on the combined amount of the copolymer and the organic solvent.

6. A coating composition prepared by dissolving a fluorine-containing copolymer in at least one ester having a boiling point of about 60° to about 250° C., the copolymer comprising:
   i) about 70 to about 85 mole % of a structural unit represented by the formula a)

$-CH_2-CF_2-$ ii) about 10 to about 20 mole % of a structural unit represented by the formula b)

$-CF_2-CF_2-$ and
   iii) about 5 to about 15 mole % of a structural unit represented by the formula c)

$-CF_2-CFCl-$ and
   iv) about 0.1 to about 10 mole % of a fluorine-structural unit d).

7. A coating composition according to claim 6 wherein the fluoroolefin is one selected from trifluoroethylene vinyl fluoride, hexafluoropropylene, and perfluoro(alkyl vinyl ester).

8. A coating composition according to claim 6 wherein the fluorine-containing copolymer has an intrinsic viscosity of about 0.15 to about 0.80 in dimethylformamide at 35° C.

9. A coating composition according to claim 6 wherein the organic solvent is at least one species selected from the group consisting of ethyl acetate, n-butyl acetate and methyl acetate cellosolve.

10. A coating composition according to claim 6 wherein the fluorine-containing copolymer is used in an amount of about 5 to about 50% by weight based on the combined amount of the copolymer and the organic solvent.

11. A coating composition according to claim 6 wherein the fluorine-containing copolymer is used in an amount of about 30 to about 50% by weight based on the combined amount of the copolymer and the organic solvent.

* * * * *